United States Patent [19]
Jenkner

[11] Patent Number: 5,220,994
[45] Date of Patent: Jun. 22, 1993

[54] PROCESS AND APPARATUS FOR TRANSPORTING WORKPIECES WITH ALIGNED EDGES ON A LOW FRICTION SUPPORT PLATFORM

[76] Inventor: Erwin Jenkner, Lindenstrasse 13, Gechingen, Fed. Rep. of Germany, D-7261

[21] Appl. No.: 800,975

[22] Filed: Dec. 2, 1991

[30] Foreign Application Priority Data

Dec. 3, 1990 [DE] Fed. Rep. of Germany ....... 4038516

[51] Int. Cl.⁵ ............................................. B65G 00/00
[52] U.S. Cl. .................................. 198/445; 198/457; 198/458; 198/740; 198/747
[58] Field of Search ............... 198/458, 740, 429, 430, 198/432, 465.01, 445, 457, 747

[56] References Cited

U.S. PATENT DOCUMENTS

| | | | |
|---|---|---|---|
| 2,661,100 | 12/1953 | Ashford | 198/429 X |
| 3,020,993 | 2/1962 | Heinrich et al. | 193/35 MD X |
| 3,189,158 | 6/1965 | Lucas | 198/721 X |
| 3,826,164 | 7/1974 | Campbell . | |
| 3,987,889 | 10/1976 | Godoy | 198/429 |
| 4,340,137 | 7/1982 | Foster | 198/457 |
| 4,437,560 | 3/1984 | Wolf | 198/457 |
| 4,591,046 | 5/1986 | Toste, Jr. et al. | 198/457 |
| 4,759,436 | 7/1988 | Persson | 198/721 |
| 4,833,954 | 5/1989 | Jenkner . | |
| 4,911,281 | 3/1990 | Jenkner . | |
| 5,042,633 | 8/1991 | Jenkner | 193/35 SS |

FOREIGN PATENT DOCUMENTS

| | | |
|---|---|---|
| 0164063 | 12/1985 | European Pat. Off. . |
| 0247408 | 12/1987 | European Pat. Off. . |
| 7342992 | 6/1974 | Fed. Rep. of Germany . |
| 2516507 | 10/1976 | Fed. Rep. of Germany ...... 198/782 |
| 2310210 | 12/1976 | France . |
| 1187496 | 4/1970 | United Kingdom . |
| 2080771 | 2/1982 | United Kingdom . |

Primary Examiner—D. Glenn Dayoan
Attorney, Agent, or Firm—Dick and Harris

[57] ABSTRACT

A process and apparatus for transporting stacked workpieces with aligned edges on a low friction workpiece support platform in which the shifting of individual panels relative to each other under the influence of inertia is precluded. The process includes the step of pressing the workpiece stack on the workpiece support platform. An apparatus that presses the workpiece stack is moved in its entirety along the direction in which the workpiece stack is transported.

18 Claims, 6 Drawing Sheets

PROCESS AND APPARATUS FOR TRANSPORTING WORKPIECES WITH ALIGNED EDGES ON A LOW FRICTION SUPPORT PLATFORM

BACKGROUND OF THE INVENTION

This invention concerns a process for conveying workpieces in the form of panels or strips stacked with their edges flush on a low friction workpiece support platform.

German Utility Patent 73 42 992, published Jun. 27, 1974, discloses a device with which each plate of a stack of panels can be fed individually in order to convey the separated strips or panels to a glue applicator machine, for example. However, the stack itself is free standing when conveyed to the separating device, and there is the danger that the stacked panels could slip or the stack could fall over during conveyance.

A goal of this invention is to provide a process and apparatus that will permit rapid horizontal conveyance of stacks of panel or strip materials, which are flush at the edges without allowing the individual layers of the stack to shift relative to each other under the influence of inertia.

This and other objects of the invention will become apparent in view of the present Specification, claim and Drawings.

SUMMARY OF THE INVENTION

The present application is directed to transporting stacks of workpiece panels or strips along or toward one or more feed directions in a production line. In particular, the present invention is directed to a process and an apparatus for transporting a stack of workpiece panels in which the panels have at least one set of edges aligned flush with one another, in such a manner that shifting of one or more of the workpiece panels relative to one another is precluded.

The process includes the step of pressing the stack of workpiece panels against the workpiece support platform utilizing a device for applying a compressive force. The device for applying a compressive force may be freely moved and positioned above the workpiece support platform. Once the stack of workpiece panels is compressed, the device for applying a compressive force is propelled, together with the workpiece panel stack, along a feed direction. Release of the device for applying a compressive force permits the stack to be further moved along another feed direction. A second device for applying a compressive force may be provided.

The present invention is also directed to an apparatus for transporting such a stack of workpiece panels without permitting the relative shifting of the panels in the stack. The apparatus comprises, in part, a low friction workpiece support surface. Means for applying compressive force to the stack of workpiece panels to press and push the stack of panels on the rollers, may be operably arranged for movement parallel to and perpendicular to the possible feed directions.

In a preferred embodiment of the invention, the low friction workpiece support surface is defined by at least one array of rollers having axes of rotation operably arranged substantially parallel to one another. The at least one array of rollers may comprise at least two arrays of rollers, the rollers of a first one of the arrays having axes of rotation arranged perpendicular to the axes of rotation of the rollers of at least the second one of the arrays. In addition, the rollers of one of the arrays are further operably disposed to be vertically adjustable, relative to another of the arrays. The rollers of one of the arrays may be operably arranged between coaxially mounted rollers of another of the respective arrays. The rollers of at least one of the arrays also may be configured to be power driven in a direction of rotation which may be coordinated with the movement of the means for applying compressive force. At least two pressure members are operably disposed for movement in directions substantially perpendicular to one another.

In a preferred embodiment of the invention, an automatic workpiece panel dividing machine is operably associated with the low friction workpiece support platform to feed stacks of divided workpiece panels to the platform for subsequent separation and feeding along at least one feed direction.

In a preferred embodiment of the invention, the means for applying compressive force comprises a guide frame operably disposed above the workpiece support surface. A shuttle is arranged for horizontal travel along the guide frame. At least two pressure devices are supported on the shuttle, at least one of which may be repositioned horizontally on the shuttle, along a direction perpendicular to the direction of travel of the shuttle. Another at least one of the pressure devices extends parallel to the shuttle. In the preferred embodiment of the invention the pressure device which extends parallel to the shuttle is a pressure beam. The at least one pressure device which is repositionable horizontally along a direction perpendicular to the direction of travel of the shuttle comprises, in a preferred embodiment, at least one vertically acting piston.

In an alternative preferred embodiment, at least two pressure devices are operably arranged on the shuttle, substantially colinearly, at spaced intervals, parallel to the direction of the travel of the shuttle.

In addition, the support platform may further comprise program control means for directing the movement of at least the at least one array of rollers, as well as the means for applying compressive force.

DETAILED DESCRIPTION OF THE DRAWINGS

While this invention is susceptible of embodiment in many different forms, there is shown in the drawings and will be described in detail herein a single specific embodiment with the understanding that the present disclosure is to be considered as an exemplification of the principles of the invention and is not intended to limit the invention to the embodiment illustrated.

The apparatus described herein provides, in an advantageous manner, a workpiece panel separating unit, especially an intersection unit, for separating workpiece panel stacks that have been transversely and longitudinally divided into stripe stack sections. Because the strip stack sections are typically arranged abutting one another side by side and end to end, prior to the present invention, it has been difficult to direct the positioning of particular strip stack sections of a particular size to further stations in an organized manner.

This invention offers a solution to the problem of conveyance of stacks or stack sections, that makes it possible to work reliably and accurately with only a few devices, in such a way, that the flush alignment of the edges of the individual layers, that come to lie one on top of the other, is assured even if the stack has a height of 200 mm or more.

Figure 1:
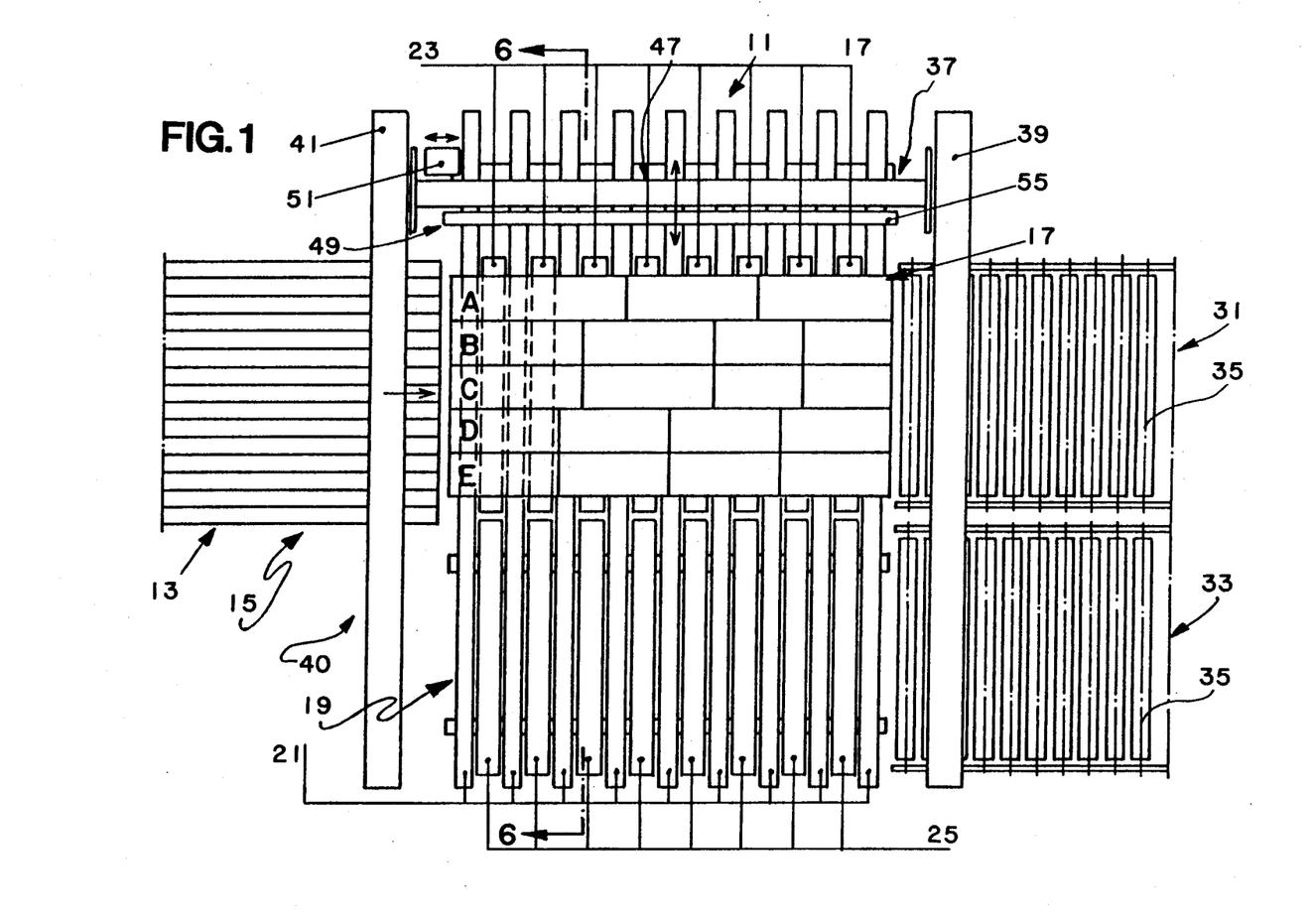
FIG. 1 is a top view of the apparatus for transporting workpieces with aligned edges, with the shuttle in a starting position, and onto whose workpiece support surface, a stack of panels, previously divided by an automatic panel divider, has been conveyed.
Figure 2:
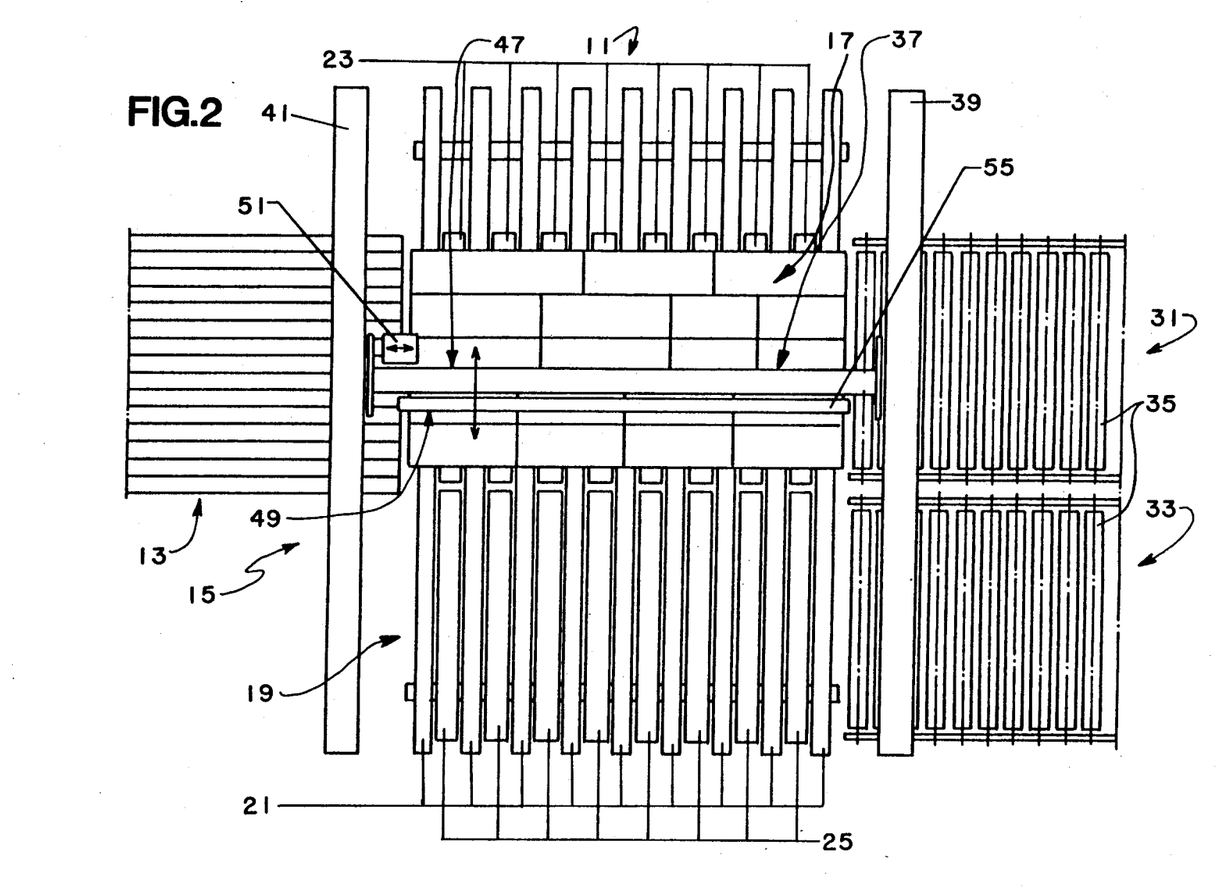
FIG. 2 is a view of the apparatus according to FIG. 1, in which the shuttle is moved into a receiving position.

Separating device 11, shown in FIG. 1 for use in the process according to this invention, is configured to separate and direct the movement of stacks of panel parts produced when a panel stack 17 is divided in an automatic panel divider 15 and conveyed from a workpiece table 13, in the direction indicated by the arrow in FIG. 1. Automatic panel divider 15 may be of known configuration, such as that disclosed in Campbell, U.S. Pat. No. 3,826,164. Strip section stacks A through E of divided panel stack 17 will be conveyed further in such a way as to assure that, when strip section stacks A to E are divided laterally and stacked with their edges flush, the individual panels or strips of the stacks will not shift relative to each other.

For this purpose, separating device 11 has a receiving platform generally indicated by 19, onto which divided board stack 17 is conveyed from workpiece table 13. This receiving platform 19 comprises, for example, three roller tables 21, 23 and 25. In FIGS. 1 to 4, rollers of roller tables 21, 23, 25 are indicated merely by rectangular fields for the sake of simplicity in illustration. Program control means 8 (FIG. 6) are provided to control and coordinate the various operations of separating device 11.

Figure 6:
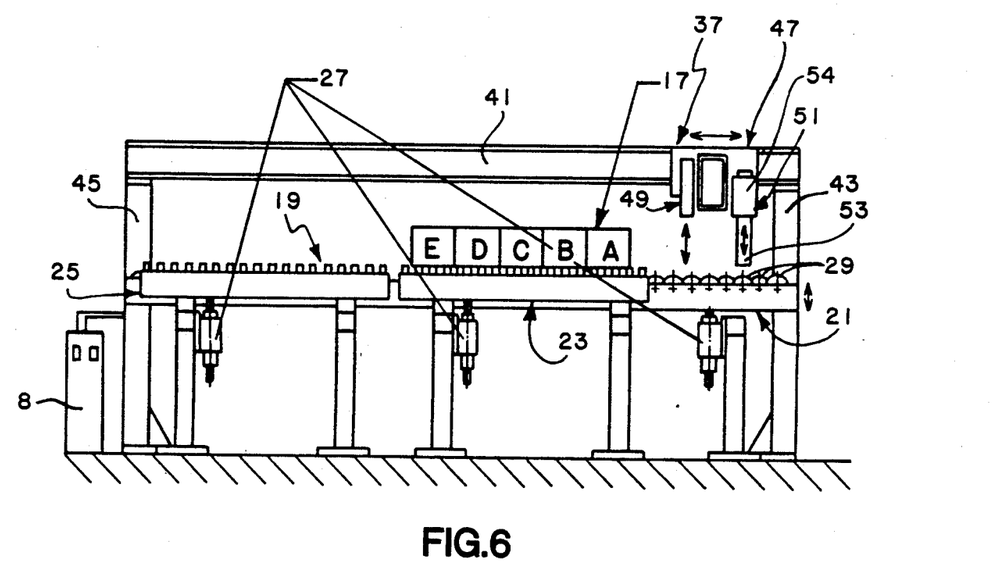
FIG. 6 is a longitudinal section along line 6—6 in FIG. 1, in which one of the groups of rollers is shown in a lowered position relative to the two other groups of rollers.
Figure 7:
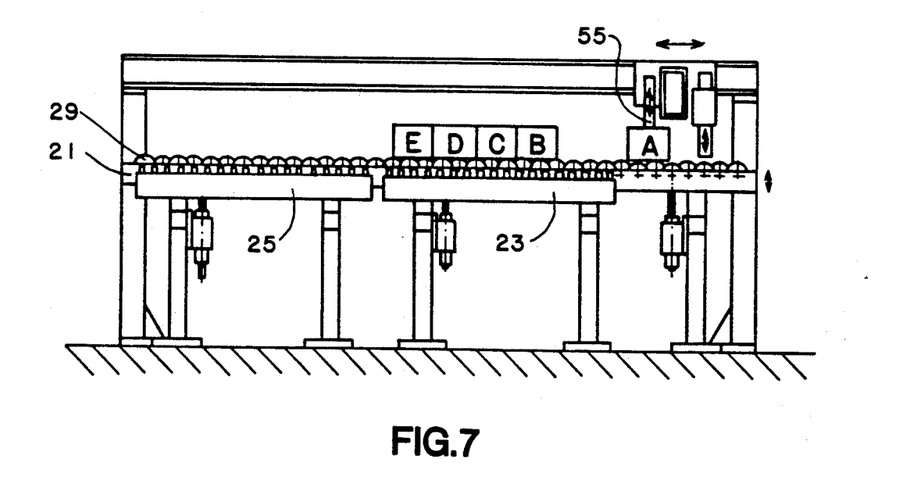
FIG. 7 is a view of the apparatus according to FIG. 6, in which the group of rollers illustrated in the lowered position in FIG. 6 has been raised into the transfer position and is higher than the two other groups of rollers.

As shown in FIGS. 6 and 7, roller tables 21, 23 and 25 are mounted so that they can be raised and lowered relative to one another by means of hoisting devices 27, preferably in the form of pneumatically controlled cylinders. Rollers 29, of roller table 21, for example, can thus be placed in an upper receiving position (see FIG. 7), in order to convey strip section stacks A to E at right angles to the direction of receipt of the divided panel stack 17 from automatic panel divider 15, while when table 21 is lowered, the two roller tables 23 and 25 are raised and thus placed in a receiving position (see FIG. 6), in order to receive the divided panel stack 17 or parts thereof. Alternatively, roller table 21 alone, or roller tables 23 and 25 alone, may be provided with lifting apparatus to enable roller table 21 to be positioned above or below roller tables 23 and 25. In addition, rollers 29 of roller tables 21, 23 and 25 may be power driven, such as by a belt drive (not shown), and may be controlled by program control means 8, in particular, to be coordinated with the movements of shuttle 47 and pusher device 51 described hereinafter.

Roller tables 23 and 25 are each positioned adjacent a sorting station, namely roller tables 31 and 33, respectively, on the side of separating device 11, which is positioned opposite automatic panel divider 15, such that rollers 35 of roller tables 31 and 33 are mounted parallel to the axes of running rollers 29 of roller tables 23 and 25. Rollers 35 define a horizontal contact plane which meets the plane defined by the running rollers 29 of roller tables 23 and 25, when table 21 is below the height of tables 23 and 25.

Supported above the receiving platform 19, is a clamp/pusher apparatus generally indicated by 37. Clamp/pusher apparatus 37 is arranged for movement between two parallel horizontal guide rails 39 and 41, which, supported by vertical supports 43 and 45, form part of guide frame 40. Clamp/pusher apparatus 37 includes shuttle 47 which can be conveyed on guide rails 39 and 41, in directions generally parallel to guide rails 39 and 41, by means of a drive device (not shown) according to a programmable control device of conventional construction, which is indicated by numeral 8 in FIG. 6. Clamping device 49 and pusher device 51 are arranged on each longitudinal side, respectively, of shuttle 47, in the present embodiment.

Clamping device 49, in a preferred embodiment, includes pressure beam 55, which can be raised and lowered, pneumatically, for example, and can be lowered to press against a section of divided panel stack 17.

Pusher device 51, in a preferred embodiment, can be propelled along the expanse of shuttle 47 in a program-controlled manner. As FIG. 6 shows in the present embodiment, pusher device 51 is equipped with a piston 53, which is adjustable in height and can also be brought to bear on a topmost panel or strip of the divided panel stack 17, by a pneumatic cylinder 54, for example.

To transfer divided panel stack 17 from workpiece holding table 13 of automatic panel divider 15, roller table 21 is brought to its starting position shown in FIG. 6 bringing roller table 23, positioned adjacent to workpiece holding table 13 upward into its transfer position illustrated in FIG. 6. Clamp/pusher apparatus 37 is preferably in its starting configuration as illustrated in FIG. 1.

Clamp/pusher apparatus 37 begins to operate subsequent to the desired severing of the divided panel stack 17. Assume, for example, that two transversely divided strip sections D and E are sent together to roller table 33 to be conveyed away on it for further processing.

Figure 3:
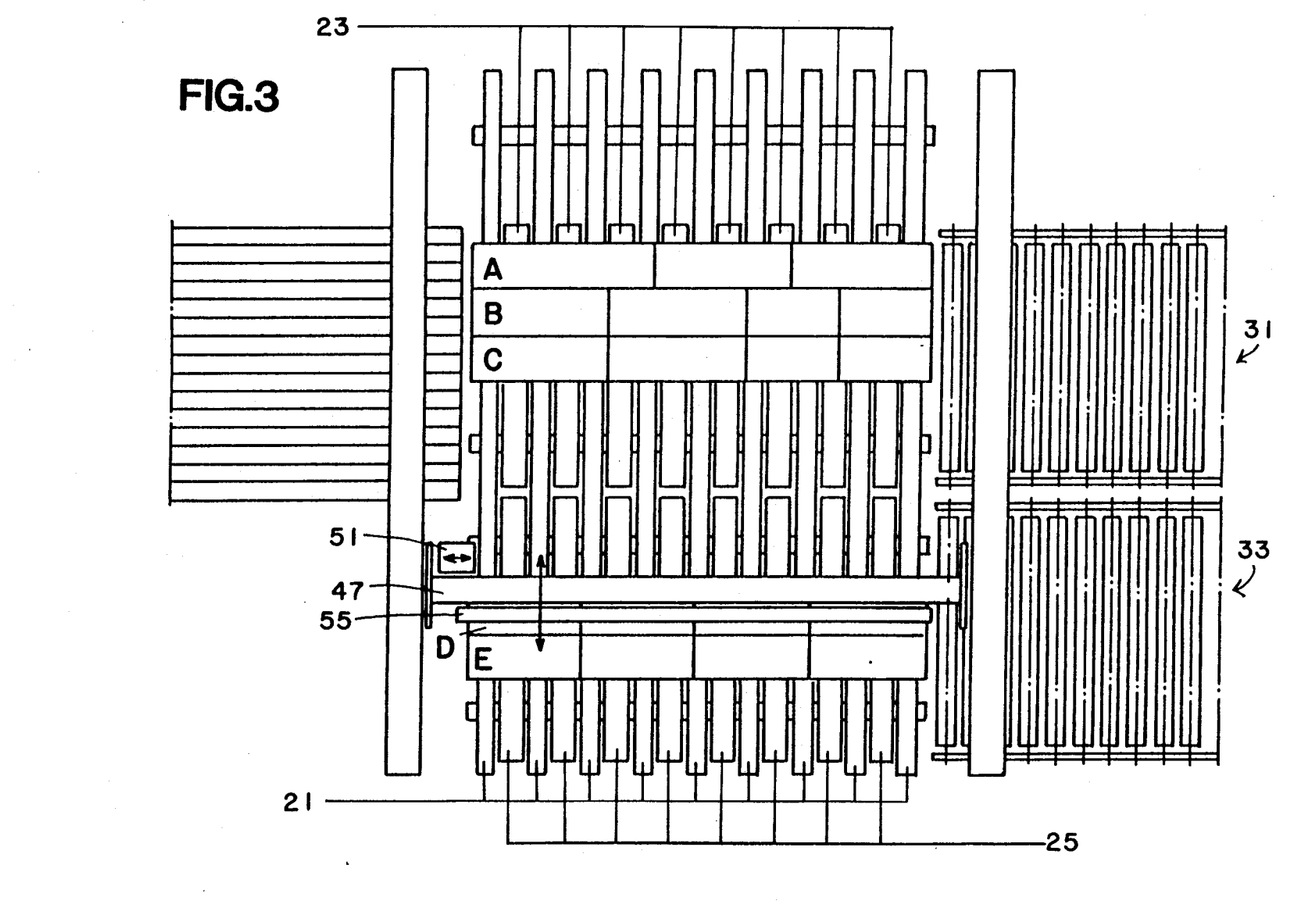
FIG. 3 is a view of the apparatus according to FIG. 1, in which the shuttle has conveyed two transversely divided stack sections of the divided board stack into a transfer position.
Figure 4:
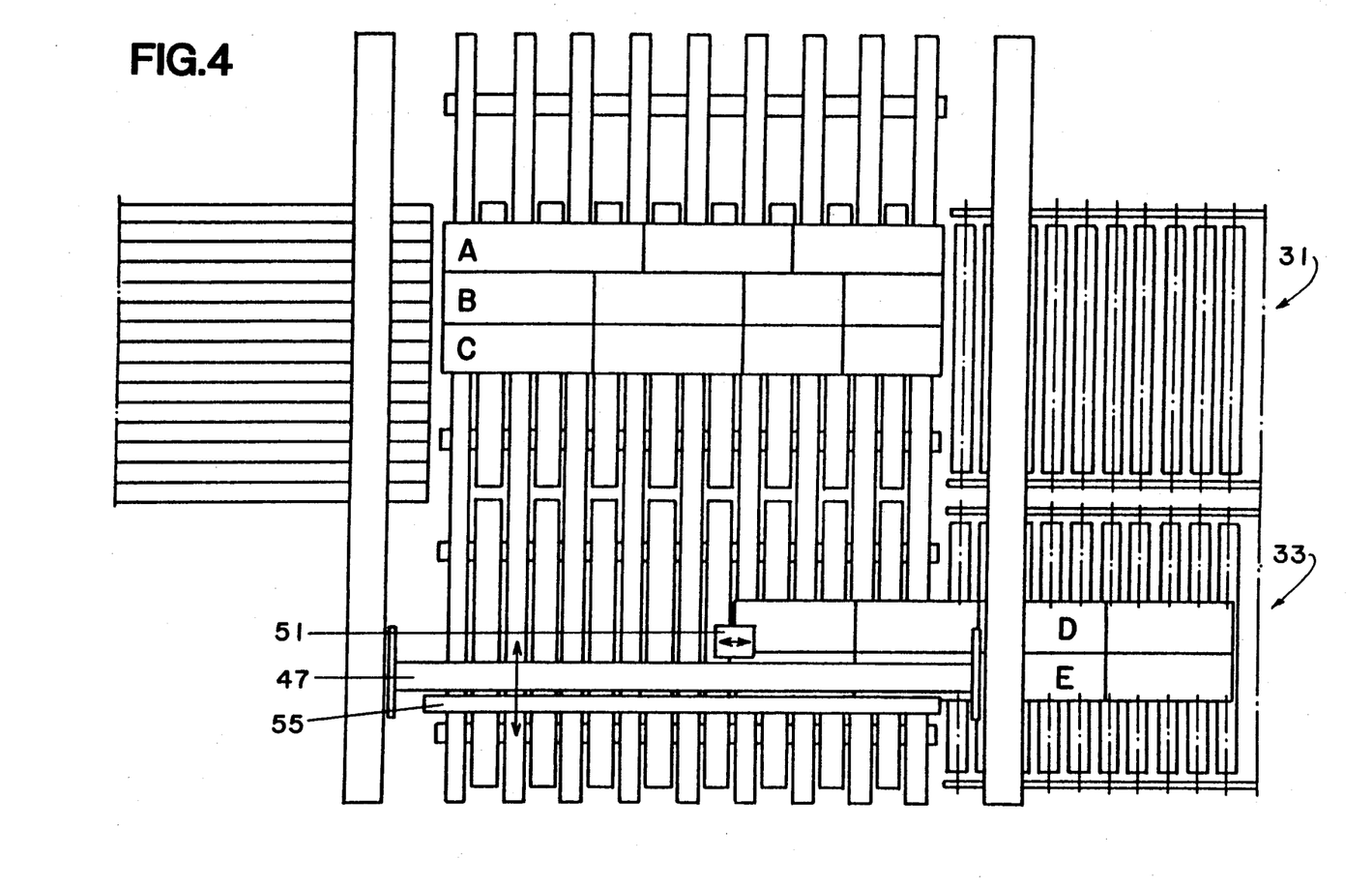
FIG. 4 is a view of the apparatus according to FIG. 3, in which the two strip stacks that have been conveyed into a transfer position have been moved partially onto a receiving table by a pusher device carried by the shuttle.
Figure 5:
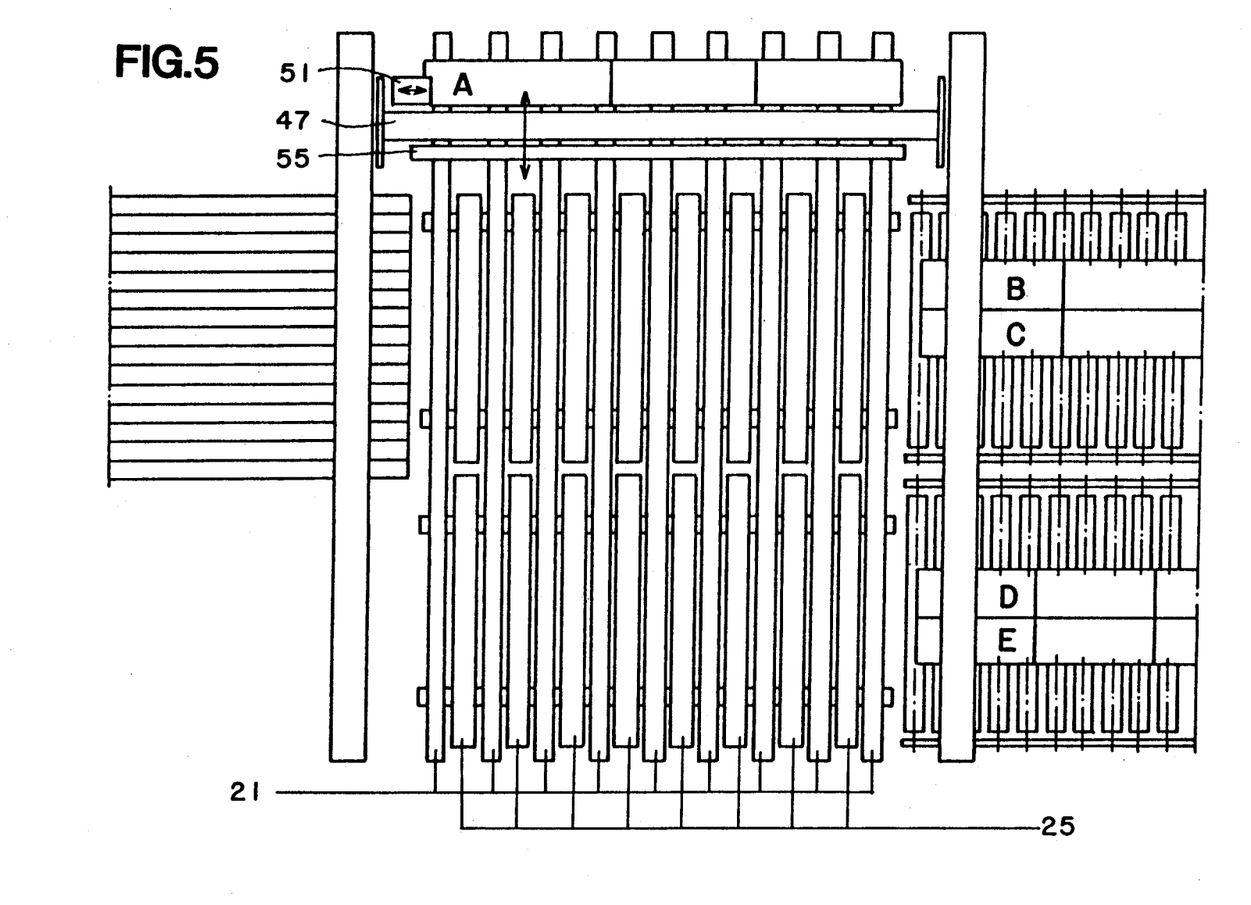
FIG. 5 is a view of the apparatus according to FIG. 1, in which a transversally divided stack section has been moved into another transfer position by the shuttle.

For this purpose, shuttle 47 is shifted, while pressure beam 55 of clamping device 49, is raised and piston 53 on pusher device 51 is raised above divided panel stack 17, so that pressure beam 55 can be aligned with and lowered onto panel strip section D and pressed against it. Once pressure beam 55 is bearing against section D, shuttle 47 is activated again and propels both section stacks D and E together into a sorting position in front of roller table 33, as illustrated in FIG. 3. To prevent separation of section stacks D and E, due to inertia effects, roller table 21, for example, may be provided with a braking device (not shown) to slow section stacks D and E as they approach the desired transfer position adjacent roller table 33. Then pressure beam 55 moves upward, releasing section D. Piston 53 is then lowered onto the end of section stacks D and E, pressing downward simultaneously onto the topmost panels of each section stack. Pusher device 51 is then propelled toward roller table 33, forcing section stacks D and E onto roller table 33. (FIG. 4).

Alternatively, section stacks D and E may be fed onto roller table 33 separately (not shown). Shuttle 47 could be indexed over section stack E such that carriage 51 is above section D, with piston 53 then lowered and pressed downward onto the end of the top panel section D. Then carriage 51 would be moved along shuttle 47 to propel section D onto roller table 33. After raising piston 53 and returning the pusher device 51 back to its starting position, as shown in FIG. 3, shuttle 47 would again start up operation and bring the pusher device 51 onward past section E, after which section E could be conveyed onto roller table 33 in the manner described previously, by means of piston 53.

However, the design can also be such that pusher device 51 is equipped with a number of pistons 53 that are provided in spaced alignment parallel to the direction of movement of shuttle 47, such that any desired number of stack sections can be conveyed onto roller tables 31 and 33 during a single conveyance operation of carriage 51.

For longitudinal conveyance of the stack sections, it is sufficient if each piston 53 of pusher device 51 is lowered onto a respective strip stack section to press downward onto the end of the strip stack section (the left end of the stack section, as seen in FIGS. 1-5). Of the strip stack sections which are to remain, the section adjacent those which are to be conveyed is held, over its entire length, by pressure beam 55.

Assume that in the next positioning operation of the clamp/pusher apparatus 37, stack section A is conveyed from roller table 21 in the opposite direction from stack sections D and E. For this purpose, shuttle 47 is positioned in such a way that pressure beam 55 is located above stack section A and the stack can be conveyed away after pressure beam 55 is brought to bear on the stack. When stack section A has reached the transfer position, pusher device 51 is positioned in the end area of stack A by means of appropriate control of shuttle 47, such that subsequently pusher device 51 and stack section A can be sent to another roller table (not shown in the figure) at the right, according to FIG. 5, with the help of piston 53. The two stack sections B and C that remain in their as-delivered condition are propelled by the clamp/pusher apparatus 37 to roller table 31, in the same manner as described with respect to stack sections D and E, in which case roller table 21 is returned to a position lower than roller table 23.

This invention is based on the finding that for conveyance of a stack of panels aligned at the edges, it is sufficient if the stack formed in this way is pressed downward against the low friction workpiece support platform, by a device that produces a pressing force and is then conveyed in the desired feed direction. A relatively small pressing force is sufficient, so air cushion tables can also be used to support materials, as an alternative to roller tables.

With the help of the transfer device illustrated in the figures, the process according to this invention can be carried out advantageously. At the same time, however, the combination of clamping device 49 and piston 53, on clamp/pusher apparatus 37, form an independently patentable arrangement for separating individual stack sections from an entire divided stack both individually and in groups in either longitudinal or transverse directions.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. An apparatus for separating and direction the movement of stacks of workpiece panels along a number of possible feed directions upon a low friction workpiece support platform comprising:
    means defining a low friction workpiece support surface, and means for applying compressive force to at least one stack of workpiece panels to press the stack of workpiece panels onto said workpiece support surface, the means for applying compressive force operably arranged for linear translatory movement parallel to and perpendicular to the possible feed directions.

2. The apparatus according to claim 1 wherein said means defining a low friction workpiece support surface comprises at least one array of rollers defining a low friction workpiece support surface.

3. The apparatus according to claim 2 wherein said low friction workpiece support surface comprises at least two arrays of rollers, the rollers of a first one of the arrays having axes of rotation arranged perpendicular to the axes of rotation of the rollers of at least a second one of the arrays, at least one of the arrays operably disposed to be vertically adjustable relative to the at least second one of the arrays.

4. The apparatus according to claim 3 comprising at least one array of rollers having axes of rotation operably arranged substantially parallel to one another, the rollers of one of the arrays operably arranged between coaxially mounted rollers of another of the arrays.

5. The apparatus according to claim 3 wherein the rollers of at least one of the arrays are configured to be power driven in a direction of rotation which direction of rotation may be coordinated with the movement of the means for applying compressive force.

6. The apparatus according to claim 1 wherein the means for applying compressive force further comprises at least two pressure members operably disposed for movement in directions substantially perpendicular to one another.

7. The apparatus according to claim 6, wherein an automatic workpiece panel dividing machine is operable associated with the low friction workpiece support platform to feed stacks of divided workpiece panels to the platform for subsequent separation and feeding along at least one feed direction.

8. The apparatus according to claim 1 wherein the means for applying compressive force further comprises:
    a guide frame operably disposed substantially above the workpiece support surface;
    a shuttle arranged for travel along the guide frame;

at least two pressure devices supported on the shuttle, one of which may be repositioned horizontally along a direction perpendicular to the direction of travel of the shuttle and another at least one of which pressure devices extends along the length of the shuttle and is perpendicular to the direction of travel of the shuttle.

9. The apparatus of claim 8 wherein the pressure device which extends perpendicular to the direction of travel of the shuttle further comprises a vertically acting pressure beam.

10. The apparatus of claim 8 wherein the at least one pressure device which is repositionable along a direction perpendicular to the direction of travel of the shuttle further comprises at least two pressure devices operably arranged substantially colinearly to one another along the direction of travel of the shuttle.

11. The apparatus of claim 8 wherein at least one of the pressure devices comprises a fluid propelled vertically moving piston.

12. The apparatus according to claim 3, further comprising a program control means for direction movement of at least one array of rollers and the means for applying compressive force.

13. An apparatus for separating and direction the movement of stacks of workpiece panels along a number of possible feed directions upon a low friction workpiece support platform comprising:
    means defining a low friction workpiece support surface, and
    means for applying compressive force to at least one stack of workpiece panels to press the stack of workpiece panels onto said workpiece support surface, the means or applying compressive force operably arranged for movement parallel to and perpendicular to the possible feed directions, and further including at least two pressure members operably disposed for movement in directions substantially perpendicular to one another.

14. The apparatus according to claim 13, wherein an automatic workpiece panel dividing machine is operably associated with the low friction workpiece support platform to feed stacks of divided workpiece panels to the platform for subsequent separation and feeding along at least one feed direction.

15. An apparatus for separating and directing the movement of stacks of workpiece panels along a number of possible feed directions upon a low friction workpiece support platform comprising:
    means defining a low friction workpiece support surface;
    means for applying compressive force to at least one stack of workpiece panels to press the stack of workpiece panels onto said workpiece panels to press the stack of workpiece panels onto said workpiece support surface, the means for applying compressive force operably arranged for movement parallel to and perpendicular to the possible feed directions;
    a guide frame operably disposed substantially above the workpiece support surface;
    a shuttle arranged for travel along the guide frame; and
    at least two pressure devices supported on the shuttle, one of which may be repositioned horizontally along a direction perpendicular to the direction of travel of the shuttle and another at least one of which pressure devices extends along the length of the shuttle and is perpendicular to the direction of travel of the shuttle.

16. The apparatus of claim 15 wherein the pressure device which extends perpendicular to the direction of travel of the shuttle further comprises a vertically acting pressure beam.

17. The apparatus of claim 15 wherein the at least one pressure device which is repositionable along a direction perpendicular to the direction of travel of the shuttle further comprises at least two pressure devices operably arranged substantially colinearly to one another along the direction of travel of the shuttle.

18. The apparatus of claim 15 wherein at least one of the pressure devices comprises a fluid propelled vertically moving piston.

* * * * *

UNITED STATES PATENT AND TRADEMARK OFFICE
CERTIFICATE OF CORRECTION

PATENT NO. : 5,220,994

DATED : June 22, 1993

INVENTOR(S) : Erwin Jenkner

It is certified that error appears in the above-identified patent and that said Letters Patent is hereby corrected as shown below:

Col. 3, Line 22    Delete "stripe" and insert --strip --.

Col. 5, Line 14    Delete "carriage" and insert -- pusher device --.

Col. 5, Line 17    Delete "carriage" and insert -- pusher device --.

Col. 5, Line 31    Delete "carriage" and insert -- pusher device --.

Col. 6, Line 18    Delete "direction" and insert -- directing --.

Col. 7, Line 22    Delete "direction" and insert -- directing --.

Col. 7, Line 25    Delete "direction" and insert -- directing --.

Signed and Sealed this

Twenty-ninth Day of March, 1994

Attest:

BRUCE LEHMAN

Attesting Officer    Commissioner of Patents and Trademarks